United States Patent [19]
Chaney, Sr.

[11] Patent Number: 5,743,682
[45] Date of Patent: Apr. 28, 1998

[54] HOLE SAW GUIDE

[76] Inventor: Ramon William Chaney, Sr., 1282 Creamery Rd., Union City, Mich. 49094

[21] Appl. No.: 749,533

[22] Filed: Nov. 15, 1996

[51] Int. Cl.$^6$ ..................................................... B23B 41/00
[52] U.S. Cl. ............................................. 408/79; 408/204
[58] Field of Search ............................... 408/79, 80, 204, 408/703, 81, 82, 209

[56] References Cited

U.S. PATENT DOCUMENTS

| | | | |
|---|---|---|---|
| 2,633,040 | 3/1953 | Schlage | 408/79 |
| 3,907,452 | 9/1975 | Tripp. | |
| 4,579,486 | 4/1986 | Damico. | |
| 4,749,315 | 6/1988 | Mills | 408/80 |
| 4,759,666 | 7/1988 | Grab. | |
| 4,968,189 | 11/1990 | Pidgeon. | |
| 5,366,326 | 11/1994 | Converse. | |
| 5,413,437 | 5/1995 | Bristow. | |

FOREIGN PATENT DOCUMENTS

| | | |
|---|---|---|
| 748147 | 12/1966 | Canada. |
| 2 234 825 | 1/1974 | Germany. |
| 61-152309 | 7/1986 | Japan. |

*Primary Examiner*—Daniel W. Howell
*Attorney, Agent, or Firm*—Reising, Ethington, Learman & McCulloch

[57] ABSTRACT

A hole tool guide assembly (10) for use with a hole saw (20) includes a conically shaped core member (12) with a central longitudinal aperture (24) and an offset parallel aperture (32) to receive a pilot of a hole saw. A coil spring (18) biases the member (12)—against a work piece within an existing hole (62) to resize and reposition a new hole (67) through the work piece (60).

9 Claims, 3 Drawing Sheets

HOLE SAW GUIDE

TECHNICAL FIELD

The field of this invention relates to a hole saw guide device for guiding a hole saw when used to enlarge existing holes in a work piece.

BACKGROUND OF THE DISCLOSURE

Hole saws are a useful and convenient tool accessory for a power drill to cut a hole in a work piece such as a door. The hole saw often has a central pilot drill surrounded by a cylindrical saw having cutting teeth along its forward edge. The pilot drill extends forward of the teeth and is drilled into the work piece before the hole saw teeth encounter the work piece front surface. The pilot drill thus anchors the hole saw in place as it first starts to cut into the front surface of the work piece.

It is known that in the absence of the pilot drill the hole saw may walk across the outer surface of the work piece as the saw starts to cut into the work piece to form the hole. The walking is undesirable particularly if the outer surface of the work piece such as a door has cosmetic value and should be free of scratches or other mars.

It is also known that when a hole saw is used to enlarge an existing hole, the pilot drill is useless because it has a substantially smaller diameter than the old existing hole and will not anchor the hole saw or prevent it from walking across the front surface of the work piece. Attempts have been made to overcome the problem of hole saw walking during this situation.

The need for solving this walking problem is particularly pertinent to older doors that are being updated with new hardware. Doors with older non-conventionally sized door hardware often have holes that are substantially smaller than the holes needed for conventionally sized present day hardware. Most present day door hardware has been standardized to either have a cross bore that needs a 2 & ⅛ inch (54 mm) hole or a 1 & ⅝ inch (42 mm) hole. As such these doors need to have the holes resized. Furthermore, older doors often have the central axis of the door knobs placed closer to the edge of the door, i.e. have a smaller backset, than the door knobs of today. The door knobs of today are placed further from the door edge to reduce banged knuckles and provide more room for comfortably operating the door knob. While older doors are commonly found to have holes with centers with a backset of 2 & ⅜ inches from the door edge, it is common and desirable practice today to place door knobs with a backset of 2 & ¾ inches.

Various attempts have been made to resize and reposition the hole for the door knob hardware. Plug guides have been devised to fit into the existing hole and allow the pilot drill to form an anchor in a central aperture in the plug guides. The problem with many of these guides is that they are only useful for an existing hole of one size. However the non-standard variety of older hole sizes require many differently sized plugs. Furthermore the plug has no ability to reposition the center of the new hole from center point of the existing hole i.e. the new enlarged hole is coaxial with the old hole.

Other plugs have been devised with laterally placed set screws that can be adjusted to fit into the existing hole and provide for an asymmetric positioning of the plug in the existing hole to reposition the center of the enlarged new hole. Such devices however have many moving parts and are difficult and time consuming to use.

What is needed is a convenient, economical, and expeditiously used hole saw guide that can accommodate existing holes of varying sizes and for forming either a coaxially positioned enlarged hole or newly positioned enlarged hole.

SUMMARY OF THE DISCLOSURE

In accordance with one aspect of the invention, a hole saw guide assembly for use in combination with a hole saw for enlarging an existing hole in a work piece includes a generally conically shaped core member and a generally conically shaped sleeve that seats on or receives the core member. The core member has a conically shaped first side wall section and a first longitudinal central aperture therethrough extending from a top end to a bottom end and being sized to slidably receive a pilot of the hole saw. The core member has a second longitudinal aperture radially spaced from the central aperture that also extends from the bottom end and extends through the conically shaped side wall section. A second wall section is positioned diametrically opposite the second longitudinal aperture. The second wall section is generally arcuate in shape having a radial center aligned with the center axis of the second longitudinal aperture such that the second wall section can be in proximity to an inner diameter surface of the hole saw.

An appropriately sized first spring seats against the bottom end of the core member and is positionable between the core member and the hole saw to provide bias of the core member outward from the hole saw to engage the edge of the existing hole in the work piece as the hole saw is pressed against the work piece. The pilot extends through a select one of the first and second longitudinal apertures.

In one embodiment, the hole saw guide assembly further includes a sleeve with a generally conically shaped first outer wall section and a conically shaped inner surface sized to seat onto the conically shaped first wall section of the core member. The sleeve has an open top end for allowing the pilot of the hole saw to extend therethrough when extending through the select one of the first and second longitudinally extending apertures in the core member. The sleeve has a respective second wall section being generally arcuate in shape to align with the second wall section of the core member and following a radial arc with a center aligned with the second longitudinal aperture such that the second wall also can be in proximity to the inner diameter surface of the hole saw. The sleeve has a bottom edge of its arcuate wall section being notched to smoothly blend with and be aligned with a top edge of the second wall section of the core member.

Preferably, two springs are included for selective seating with the hole saw. The first spring is a coil spring of a predetermined uncompressed length for selective seating about the pilot of the hole saw for resiliently biasing the core member again smaller existing holes in the work piece. A second coil spring of a longer uncompressed length can be selectively substituted for the first coil spring for seating about the pilot of the hole saw for resiliently biasing the core member and the sleeve for placement in larger existing holes in the work piece.

Preferably, the sleeve has a bottom end surface that, when fully seated on the core member, is axially aligned with the bottom end of the core member. The core member has an annular groove about the first longitudinal aperture for seating the selected one of said first and second coil springs. A second annular groove is coaxially positioned about the second longitudinal aperture. The second annular groove extends through the end of said core member and the aligned end surface of the sleeve.

It is desirable that the core member has an axially extending exterior rib for rotationally affixing the core member in the existing hole. The sleeve member has an axially extending rib for also rotationally affixing the sleeve member in the existing hole and an internal axial groove for nonrotationally seating on the rib of the core member.

In accordance with another aspect of the invention, a hole saw and guide assembly is for enlarging an existing hole in a work piece. The hole saw and guide assembly includes a hole saw with a cylindrical shaped cutting edge at the forward edge of a cylindrical shaped body. The hole saw body has a rearward end wall connected to a mounting mandril with a central aperture therethrough. A cylindrical pilot shank extends through the central aperture in the mandril, passes through the hole saw, and extends forwardly beyond the forward cutting edge. The coil spring seat seats a rear end of a coil spring about the cylindrical pilot. A generally conically shaped core member has a conically shaped side wall section and a longitudinally extending aperture therethrough from a forward end to a rearward end. The aperture has a diameter sized to freely slidably engage and receive the cylindrical pilot shank and to disengage from the pilot shank at its forward end. The rearward end of the core member seats against the spring to provide bias of the core member outward from the hole saw to engage the work piece at the peripheral edge of the existing hole in the work piece as the hole saw is pressed against the work piece with its pilot extending through the longitudinal aperture.

It is desirable that the longitudinal aperture in the core member is centrally located along the longitudinal axis thereof. Alternatively, the longitudinal aperture is asymmetrical located and spaced from the longitudinal axis of the core member.

BRIEF DESCRIPTION OF THE DRAWINGS

Reference now is made to the accompanying drawings in which.

DETAILED DESCRIPTION OF THE PREFERRED EMBODIMENT

Figure 1:
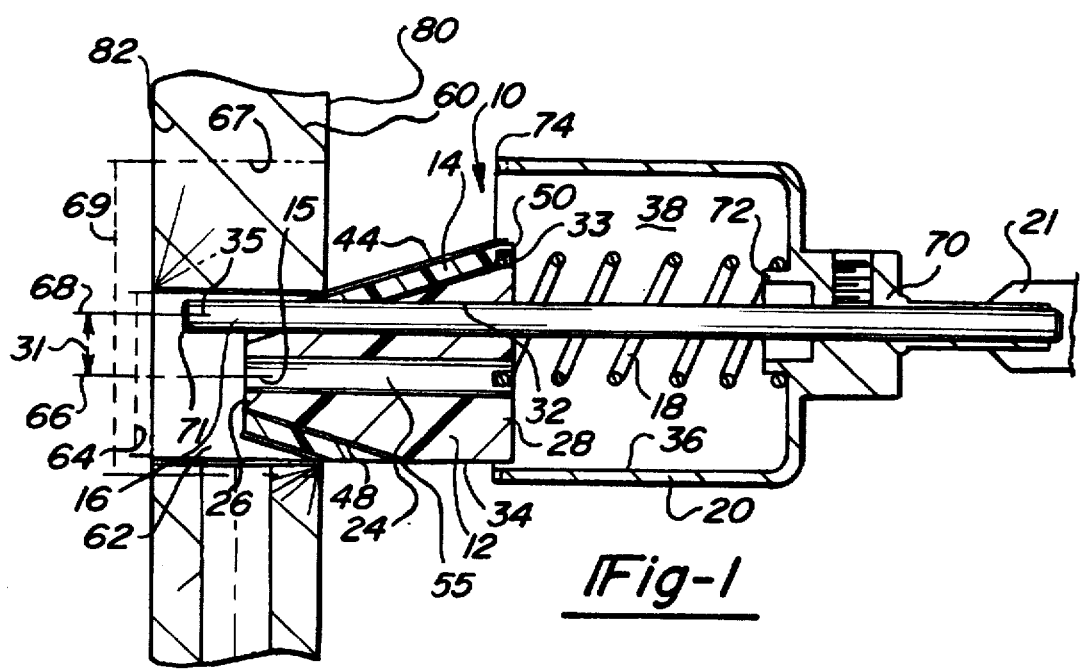
FIG. 1 is a side elevational a segmented view of one embodiment in accordance with the invention.
Figure 2:
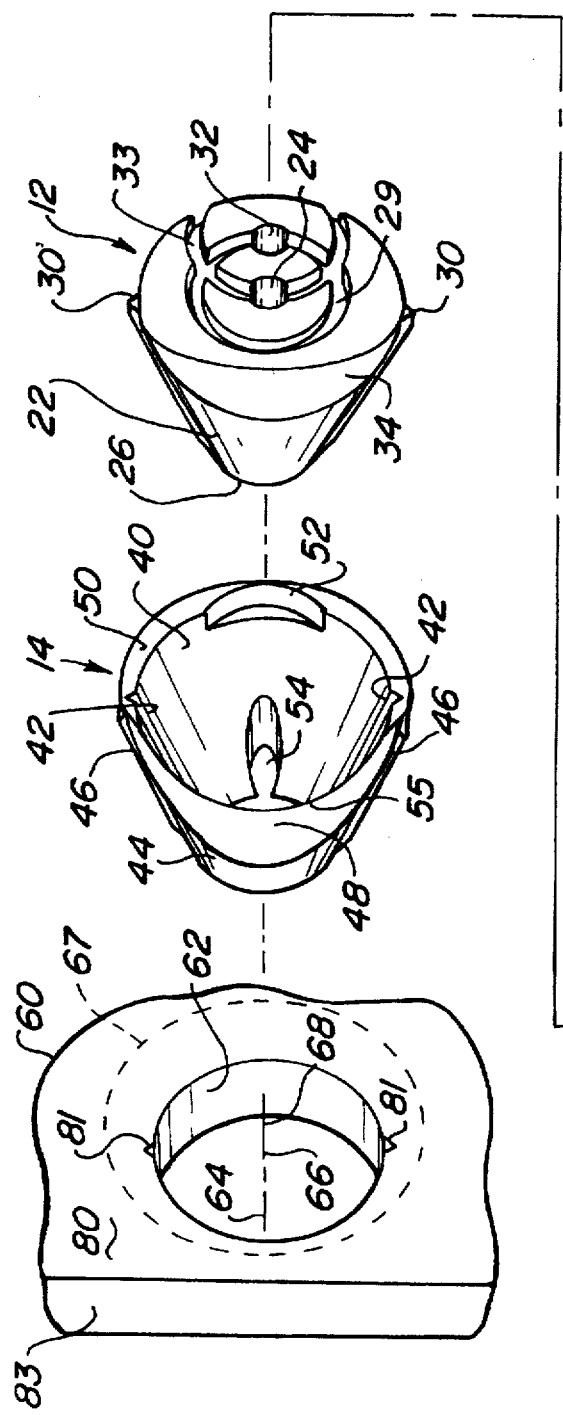
FIG. 2 is an exploded perspective view of the hole saw guide assembly shown in FIG. 1 illustrating the selective choice of a first or second spring.
Figure 2:
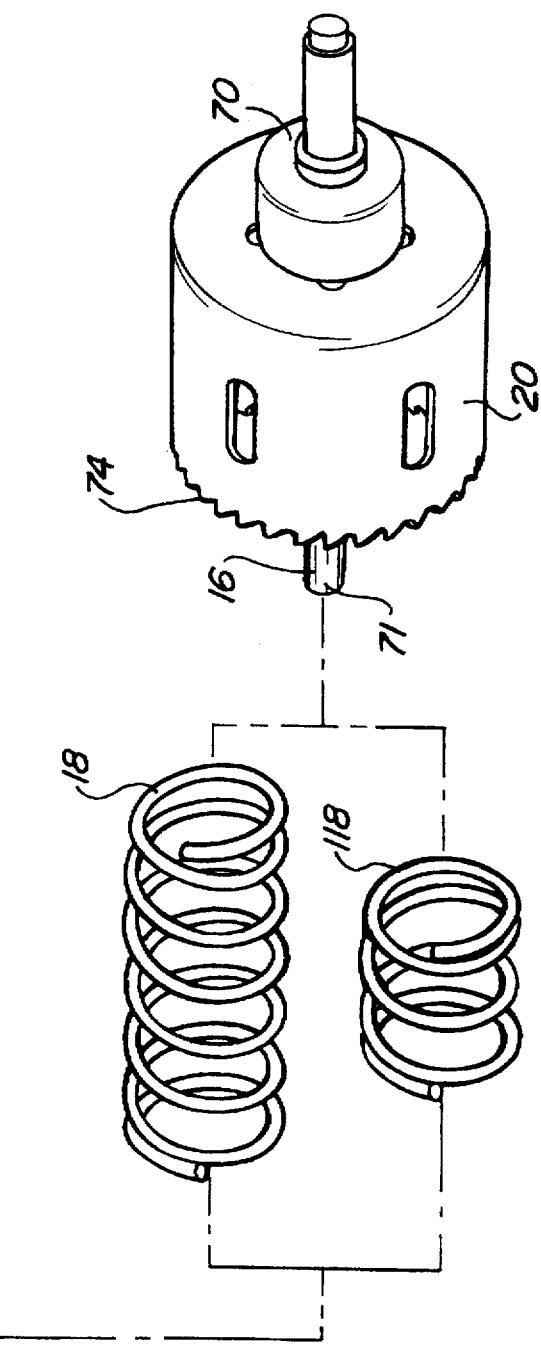

Referring now to FIGS. 1 and 2, a hole saw guide assembly generally indicated as 10, has a core member 12, a sleeve member 14, a cylindrical pilot a coil spring 18 all mounted onto a hole saw 20 that in turn can be mounted to any commercially available electric drill 21.

Figure 3:
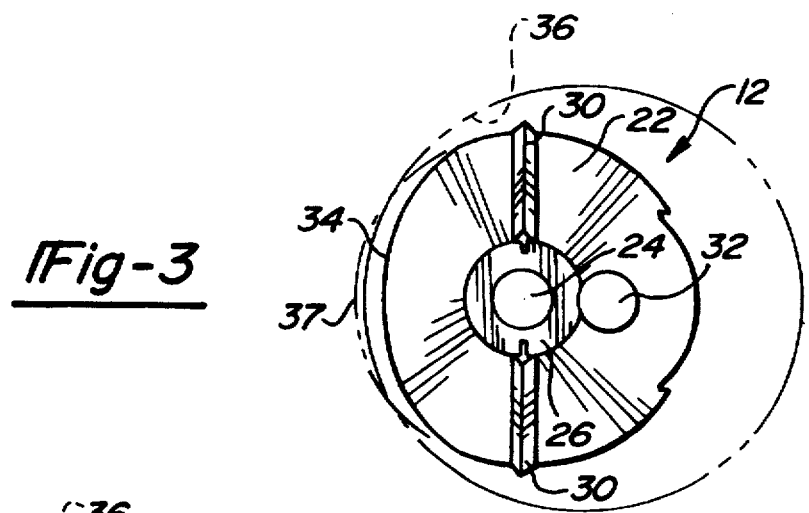
FIG. 3 is a front plan view of the core member shown in FIG. 2.
Figure 5:
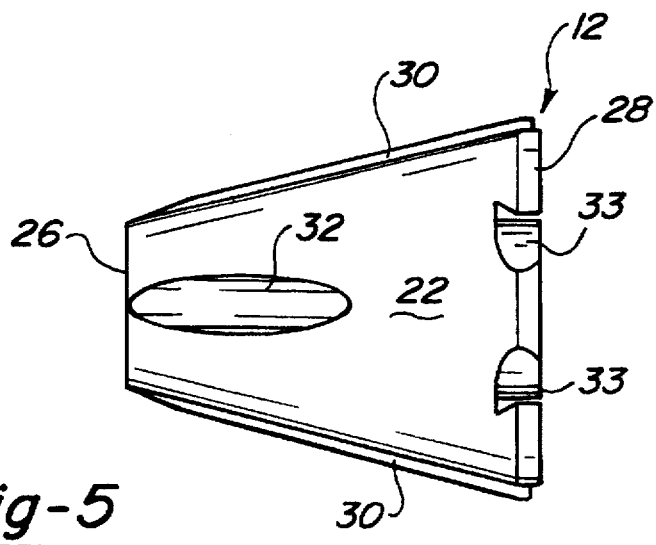
FIG. 5 is a side elevational view of the core member illustrating the oblique exit of the second longitudinal aperture therethrough.

The core member 12 as illustrated in FIGS. 2, 3, and 5 has an outer first wall section 22 that is generally conical in shape. A central longitudinal aperture 24 extends from the apex 26 to the bottom end wall 28 of the core member 12 along central axis 15. Two diametrically opposed ribs 30 axially extend along the outer wall section 22. The bottom end wall 28 has an annular groove 29 about central aperture 24 that seats one end of the coil spring 18.

A second aperture axially 32 extends through the core member and is radially spaced or offset from the central aperture a distance of ⅛ inch as indicated by distance 31 such that it extends from the bottom end wall 28 and through the first wall section at an oblique angle as clearly shown in FIG. 5. The conical wall section 22 forms circular cross sections and the largest diameter formed at the bottom end wall is preferably slightly less than the inner radius of a 1⅝" diameter hole saw such that the core can slidably fit within the 1 & ⅝ inch hole saw. A second annular groove section 33 of the same diameter as groove 29 is centered about offset aperture 32 for selectively seating the coil spring 18.

The core member has a second wall section 34 that is arcuate in shape and is orthogonal to the bottom end wall section. The arc of the second wall section is centered about the longitudinal axis 35 of the second offset aperture and has a radius slightly smaller than the radius of the inner cylindrical wall 36 of the hole saw 20 such that it can be in proximity to the inner wall 36 of the hole saw and allow the core member to fit within the interior 38 of the hole saw when the pilot 16 is received in the second offset aperture 32 as shown in FIG. 1. Differences in the radii and the difference in centers of the two wall sections makes it appear that the arcuate wall section cuts away a portion of the cone as illustrated by phantom arced section 37 shown in FIG. 3.

The sleeve 14 has an interior conical surface 40 that has two axially extending grooves 42 such that it seats with the core member with its ribs 30 as illustrated in FIG. 1. The sleeve has a first outer wall section 44 that is generally conical in shape with two diametrically opposite axially extending ribs 46. The bottom edge 50 of the sleeve has a arcuate notch 52 that aligns with groove section 33 to complete the annular groove seat of the spring. Within the side wall surface 40 is a oblique notch 54 that aligns with offset aperture 32 when the sleeve is seated on the core member.

Figure 4:
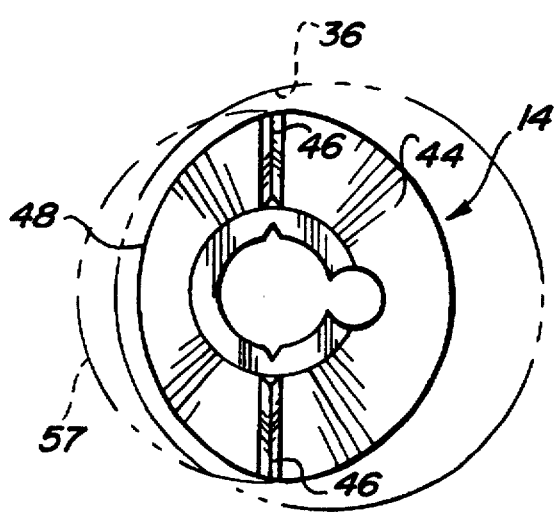
FIG. 4 is a front plan view of the sleeve member shown in FIG. 2.

The sleeve also has a second wall section 48 that is arcuate in shape with the same offset center and same radius as the arcuate wall 34 of core member such that when the two members are seated as shown in FIG. 1, they are aligned with each other. The bottom edge of the arcuate wall section forms a notch 55 or cutaway section in the sleeve. Similarly as with the core member, the differences in the radii of the first and second wall sections and different centers of each wall section makes the second wall section appear to cut into the conical outer wall section to eliminate a section as indicated by the phantom arc 57 illustrated in FIG. 4. The second wall serves the same purpose of allowing the wall 48 to be in proximity to inner surface 36 of the hole saw and allow the sleeve to intrude into the interior 38 thereof.

Both the core member and the sleeve can be molded from a rigid plastic. Other rigid materials may be used if appropriately molded or machined to the described shapes.

The pilot 16 is a cylindrical shank sized to slidably be received in either aperture 24 or 32. The pilot is free of any cutting edge as commonly found in pilot drills so as not nick or otherwise mar and degrade the apertures 24 and 32.

The use and operation of the hole guide assembly 10 is convenient and reliable. For example, with reference to FIGS. 1 and 2, if a relatively large hole 62 with a diameter indicated at 64 as shown in a wood work piece 60 needs to be both enlarged and repositioned from its center shown by axis 66 to form a hole 67 (shown in phantom) centered about axis 68 and with diameter 69, the pilot is appropriately positioned and affixed in the mandril 70 of the hole saw 20. The hole saw most commonly will have a 2⅛" size to conform to standardized hardware. The pilot and mandril are also conventionally affixed to a standard commercially available power drill 21.

The coil spring 18 is slid over the distal end 71 of the pilot and positioned about the pilot to sit on a rim or coil seat 72 of the hole saw. The core member and sleeve are then similarly slid over the distal end 71 such that the pilot extends through the offset aperture 32 and the coil spring becomes seated in annular groove 33. The coil spring 18 has an axial length sufficient to bias the sleeve and core member axially in front of the cylindrical cutting edge 74 of the hole saw 20.

The electric drill is then pressed toward the work piece 60 to compress the spring and bias the hole guide assembly such that it is pressed into hole 62 on side 80 of the work piece. Because the workpiece is wood or some other cuttable material, the ribs 46 when pressed into the wood cut notches 81 into the edge of hole 62 and rotationally locks the sleeve and core member into the hole 62. Actuation of the electric drill then starts the cutting of hole 67. Because the offset aperture 32 is ⅛" offset from central aperture 24, the new hole 67 will have its center 68 similarly displaced ⅛" from the center 66 of existing hole 62. As shown in FIG. 2, the new hole is usually positioned to have its center farther from the edge 83 of the workpiece such that the so called backset is enlarged. As with all good cutting practices, the hole saw cuts only partially through the work piece and the procedure is then repeated from the other side 82 of the work piece to complete the hole 67.

The hole guide assembly is adaptable for a variety of situations. If the existing hole 62 has its center correctly positioned such that the new hole merely needs to be enlarged and not repositioned, the same procedure is followed except that the sleeve and core member are slid onto the pilot such that the pilot extends through center aperture 24 and the coil spring 18 is seated in annular groove 29. The enlarged hole formed by the hole saw 20 then will have the same center as existing hole 62.

Figure 6:
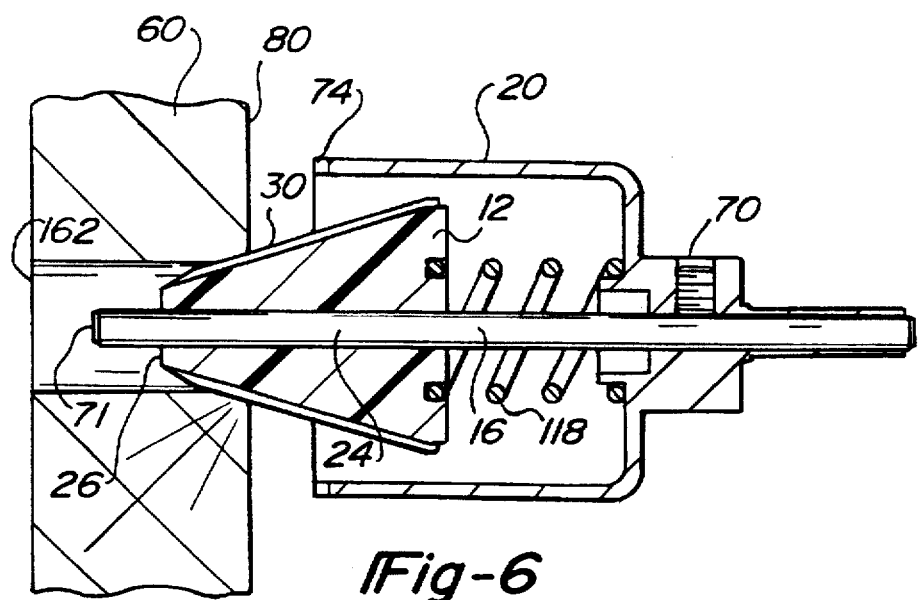
FIG. 6 is side elevation and segmented view taken at 90° from the view taken in FIG. 1 illustrating the use of the hole saw guide for a smaller existing hole.

The hole saw guide assembly also has the capability of being used for different sized existing holes. As illustrated in FIG. 6, if the existing hole 162 has a much smaller diameter than the one shown in FIG. 2, the sleeve need not be used. The core member 12 has sufficient diameter to engage the hole with its ribs 30. However, a shorter coil spring 118 is substituted for coil spring 18 for the following reason. The smaller size of hole 162 requires that the hole engages the core much closer to it distal apex end 26 than the situation illustrated in FIG. 1. Consequently, if coil spring 18 was used, the cutting edge 74 of the hole saw would be positioned farther away from the work piece front side 80 and the coil spring would therefore need to be further compressed. However, coil spring 18 may bottom out before sufficient contact of the cutting edge 74 with work piece 60. The shorter coil spring 118 allows the core member 12 to be further recessed in the hole saw interior 38 and thus bring the cutting surface 74 to be more in proximity to the work piece 60 before compression of the spring 118 occurs. The spring 118 will not bottom out before the cutting edge 74 sufficiently cuts into work piece 60. As with the larger hole 62, the pilot 16 can selectively extend through either the center aperture 24 or the offset aperture 32 of the core member for either only enlarging the new hole or both enlarging and repositioning the new hole when cutting about the existing small hole 162.

Furthermore, if a smaller hole of 1⅝" is required to be coaxially formed about the existing hole, a smaller hole saw may be used with core member 12. The diameter of bottom end wall 28 is sufficiently small to be received in a 1⅝" hole saw.

Figure 7:
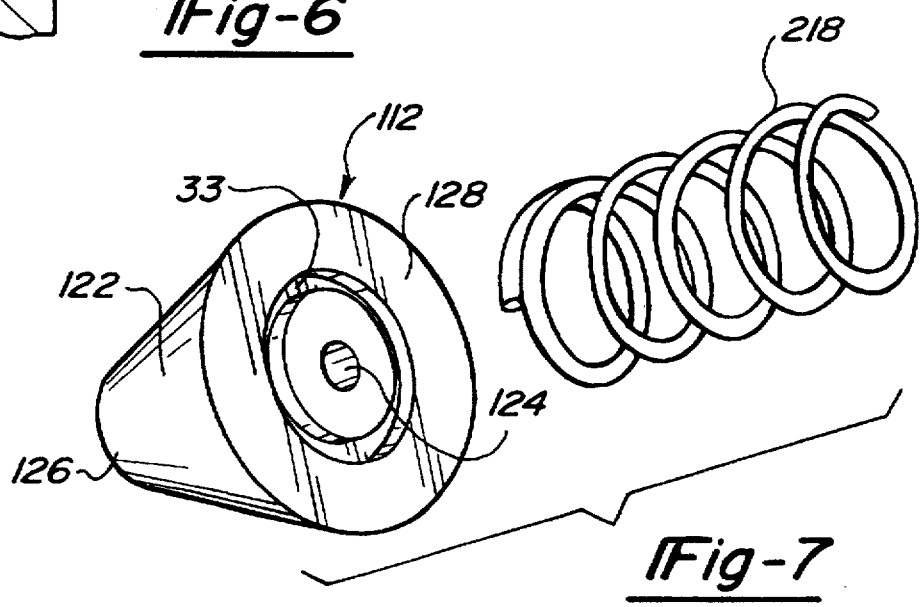
FIG. 7 is an exploded perspective view illustrating an alternate economical embodiment of the invention.

FIG. 7 illustrates an alternate embodiment which includes a frustoconical shaped core member 112 with a single central aperture 124 extending from the apex 126 through to the bottom end wall 128. A coil seating groove 33 is about the aperture. A coil spring 218 is sized to sit in the annular groove. This simplified embodiment is useful where only coaxial holes need to be formed about the existing holes. Because the hole is coaxial, the frustoconical core member has no ribs on its frustoconical outer wall 122 to nonrotationally anchor it within the hole in work piece 60. While this embodiment does not have the capability to reposition the hole, it is an economical tool that can be conveniently used to resize a variety of holes. After, the holes are repositioned and/or resized, the appropriate door hardware such as rosettes, locks and knobs can be conventionally mounted onto the work piece to conceal the new hole 67. In this fashion, a conveniently economical tool is easily used to reposition and resize holes in a work piece such as a wood door.

Variations and modifications are possible without departing from the scope and spirit of the present invention as defined by the appended claims.

The embodiments in which an exclusive property or privilege is claimed are defined as follows:

1. A hole saw guide assembly for use in combination with a hole saw for enlarging an existing hole in a work piece, said hole saw guide assembly comprising:

a generally conically shaped core member having a conically shaped first side wall section and a first longitudinally extending central aperture therethrough from a top end to a bottom end and being sized to slidably receive a pilot of the hole saw;

said core member having a second longitudinal aperture radially spaced from said central aperture and also extending from the bottom end and extending through the conically shaped side wall section;

a second wall section diametrically opposite said second longitudinal aperture and being generally arcuate in shape to be in proximity to an inner diameter surface of the hole saw;

a first spring for seating against said bottom end and interposable between said member and the hole saw to provide bias of said member outward from the hole saw to engage the existing hole in the work piece as said hole saw is pressed against said work piece with its pilot extending through a select one of said first and second longitudinal apertures.

2. A hole saw guide assembly as defined in claim 1 further comprising;

a sleeve having a generally conically shaped first outer wall section and a conically shaped inner surface sized to seat onto said conically shaped first wall section of said core member;

said sleeve having an open top end for allowing said pilot of said hole saw to extend therethrough when extending through the select one of the first and second longitudinally extending apertures in said core member;

said sleeve having a respective second wall section being generally arcuate in shape to align with the second wall section of said member and lie in proximity to the inner diameter surface of the hole saw, the sleeve having a bottom edge of its arcuate wall section being notched to smoothly blend with and be aligned with a top edge of the second wall section of the core member.

3. A hole saw guide assembly as defined in claim 2 further comprising;

said first spring being a coil spring of a predetermined uncompressed length for selective seating about said pilot of said hole saw for resiliently biasing said core member;

a second coil spring of a longer uncompressed length for selective seating about said pilot of said hole saw for resiliently biasing said core member and said sleeve.

4. A hole saw guide assembly as defined in claim 3 further comprising;

said sleeve having a bottom end surface that, when said sleeve is fully seated on said core member, is axially aligned with the bottom end of said core member;

said core member having an annular groove about said first longitudinal aperture for seating said selected one of said first and second coil springs;

a second annular groove about said second longitudinal aperture, said annular groove extending through the end of said core member and the end surface of said sleeve.

5. A hole saw guide assembly as defined in claim 2 further comprising;

said core member having an axially extending rib for rotationally affixing said core member in said existing hole.

6. A hole saw guide assembly as defined in claim 5 further comprising;

said sleeve member having an axially extending rib for rotationally affixing said sleeve member in said existing hole and an internal axial groove for non-rotationally seating on said core member.

7. A hole saw and guide assembly for use for enlarging an existing hole in a work piece, said hole saw and guide assembly comprising:

a hole saw having a cylindrical shaped cutting edge at the forward edge of a cylindrical shaped body, said hole saw body having a rearward end wall connected to a mounting mandril with a central aperture therethrough;

a cylindrical pilot shank extending through the central aperture in said mandril and passing through said hole saw and extending forwardly beyond said forward cutting edge;

a coil spring seat mounted on said rear wall for seating a rear end of a coil spring about said cylindrical pilot;

a generally conically shaped core member having a conically shaped side wall section and a longitudinally extending aperture therethrough from a forward end to a rearward end sized to freely slidably engage and receive said cylindrical pilot shank and to disengage from said pilot shank at its forward end;

said rearward end of said core member seatable against said spring to provide bias of said core member outward from the hole saw to engage the work piece at the peripheral edge of the existing hole in the work piece as said hole saw is pressed against said work piece with its pilot extending through said longitudinal aperture.

8. A hole saw and guide assembly as defined in claim 7 further comprising;

said longitudinal aperture being centrally located along the longitudinal axis of said core member.

9. A hole saw and guide assembly as defined in claim 7 further comprising;

said longitudinal aperture being asymmetrical located and spaced from the longitudinal axis of said core member.

* * * * *